(12) United States Patent
Slobodin

(10) Patent No.: US 7,970,833 B2
(45) Date of Patent: Jun. 28, 2011

(54) IMAGE CAPTURE METHOD, SYSTEM AND APPARATUS

(75) Inventor: David E. Slobodin, Lake Oswego, OR (US)

(73) Assignee: Seiko Epson Corporation, Tokyo (JP)

( * ) Notice: Subject to any disclaimer, the term of this patent is extended or adjusted under 35 U.S.C. 154(b) by 1291 days.

(21) Appl. No.: 10/860,553

(22) Filed: Jun. 2, 2004

(65) Prior Publication Data

US 2004/0264775 A1    Dec. 30, 2004

Related U.S. Application Data

(60) Provisional application No. 60/475,563, filed on Jun. 2, 2003.

(51) Int. Cl.
*G06F 15/16*    (2006.01)
(52) U.S. Cl. .......................... 709/206; 353/30
(58) Field of Classification Search .................. 709/204, 709/206; 353/30
See application file for complete search history.

(56) References Cited

U.S. PATENT DOCUMENTS

| | | | | |
|---|---|---|---|---|
| 5,608,872 | A | 3/1997 | Schwartz et al. | 709/205 |
| 5,781,190 | A | 7/1998 | Gorbet et al. | 715/748 |
| 5,867,653 | A * | 2/1999 | Aras et al. | 709/204 |
| 5,917,480 | A * | 6/1999 | Tafoya et al. | 715/732 |
| 5,956,487 | A * | 9/1999 | Venkatraman et al. | 709/218 |
| 6,008,807 | A | 12/1999 | Bretschneider et al. | 715/732 |
| 6,009,436 | A * | 12/1999 | Motoyama et al. | 707/102 |
| 6,108,687 | A * | 8/2000 | Craig | 709/203 |
| 6,437,786 | B1 | 8/2002 | Yasukawa | 345/474 |
| 6,473,749 | B1 * | 10/2002 | Smith et al. | 707/2 |
| 6,560,637 | B1 * | 5/2003 | Dunlap et al. | 709/204 |
| 6,615,239 | B1 | 9/2003 | Berstis | 709/204 |
| 6,626,543 | B2 * | 9/2003 | Derryberry | 353/119 |
| 6,728,753 | B1 | 4/2004 | Parasnis et al. | |
| 6,735,616 | B1 | 5/2004 | Thompson et al. | 709/204 |
| 6,760,045 | B1 * | 7/2004 | Quinn et al. | 715/744 |
| 6,793,352 | B2 | 9/2004 | Karasawa et al. | 353/122 |
| 6,860,609 | B2 | 3/2005 | Olson et al. | |
| 6,904,451 | B1 | 6/2005 | Orfitelli et al. | 709/203 |
| 6,907,225 | B1 * | 6/2005 | Wilkinson | 455/41.2 |
| 7,016,935 | B2 * | 3/2006 | Lee et al. | 709/204 |
| 7,018,043 | B2 * | 3/2006 | Castaldi et al. | 353/30 |
| 7,055,956 | B2 * | 6/2006 | Olson et al. | 353/30 |
| 7,085,770 | B2 * | 8/2006 | Bennett et al. | 707/102 |

(Continued)

FOREIGN PATENT DOCUMENTS

EP    1 022 905 A2    7/2000

(Continued)

OTHER PUBLICATIONS

Beardsley, P.; van Baar, J.; Raskar, R.; Forlines, C., "Interaction using a handheld projector," Computer Graphics and Applications, IEEE , vol. 25, No. 1, pp. 39-43, Jan.-Feb. 2005.

(Continued)

*Primary Examiner* — Ajay Bhatia
(74) *Attorney, Agent, or Firm* — Kilpatrick Townsend & Stockton LLP

(57) ABSTRACT

A method for selectively accessing a projected image is provided. In one embodiment, the method may include requesting an image display device to transmit over a network a projected image as displayed by the image display device. The method further may include receiving a copy of the requested projected image from the image display device in response to the request over the network.

36 Claims, 4 Drawing Sheets

U.S. PATENT DOCUMENTS

| | | | |
|---|---|---|---|
| 7,118,220 B2 * | 10/2006 | Castaldi et al. | 353/30 |
| 7,180,475 B2 * | 2/2007 | Slobodin et al. | 345/2.3 |
| 7,206,773 B2 * | 4/2007 | Erol et al. | 707/1 |
| 7,266,772 B2 * | 9/2007 | Miyashita et al. | 715/730 |
| 7,293,071 B2 * | 11/2007 | Sato et al. | 709/217 |
| 7,309,134 B2 * | 12/2007 | Cambron | 353/122 |
| 7,330,875 B1 * | 2/2008 | Parasnis et al. | 709/204 |
| 2001/0013843 A1 * | 8/2001 | Fujiwara et al. | 345/1.2 |
| 2001/0033404 A1 | 10/2001 | Escobosa et al. | |
| 2001/0054114 A1 * | 12/2001 | DuVal et al. | 709/247 |
| 2002/0012433 A1 | 1/2002 | Haverinen et al. | |
| 2002/0036652 A1 * | 3/2002 | Masumoto et al. | 345/732 |
| 2002/0122158 A1 * | 9/2002 | Miyashita et al. | 353/30 |
| 2002/0196378 A1 * | 12/2002 | Slobodin et al. | 348/744 |
| 2003/0017846 A1 | 1/2003 | Estevez et al. | |
| 2003/0093469 A1 | 5/2003 | Ohta et al. | 709/203 |
| 2003/0095113 A1 * | 5/2003 | Ma et al. | 345/175 |
| 2003/0110217 A1 | 6/2003 | Raju | |
| 2003/0117532 A1 * | 6/2003 | Karasawa et al. | 348/734 |
| 2003/0137639 A1 * | 7/2003 | Yang | 353/30 |
| 2003/0144998 A1 * | 7/2003 | Bennett et al. | 707/3 |
| 2003/0145052 A1 | 7/2003 | Watanabe | 709/204 |
| 2003/0191805 A1 * | 10/2003 | Seymour et al. | 709/204 |
| 2003/0198191 A1 * | 10/2003 | Hsiao | 370/254 |
| 2003/0202004 A1 * | 10/2003 | Lin | 345/716 |
| 2004/0051744 A1 * | 3/2004 | Fukui et al. | 345/848 |
| 2004/0117445 A9 | 6/2004 | Lee et al. | |
| 2004/0205478 A1 * | 10/2004 | Lin et al. | 715/500.1 |
| 2004/0217946 A1 * | 11/2004 | Hamano | 345/173 |
| 2004/0236830 A1 | 11/2004 | Nelson et al. | 709/204 |
| 2004/0267891 A1 | 12/2004 | Hoeye et al. | 709/206 |
| 2005/0091359 A1 | 4/2005 | Soin et al. | 709/223 |
| 2005/0160479 A1 * | 7/2005 | Kubota | 726/16 |
| 2005/0171926 A1 * | 8/2005 | Thione et al. | 707/1 |
| 2005/0174547 A1 * | 8/2005 | Yamaguchi et al. | 353/122 |
| 2005/0278455 A1 * | 12/2005 | Ichieda | 709/233 |
| 2006/0098174 A1 * | 5/2006 | Ohuchi | 353/122 |
| 2007/0033528 A1 * | 2/2007 | Merril et al. | 715/732 |
| 2008/0074560 A1 * | 3/2008 | Ichieda | 348/739 |

FOREIGN PATENT DOCUMENTS

| | | |
|---|---|---|
| JP | 2002057964 A | 2/2002 |

OTHER PUBLICATIONS

Ashdown, M.; Robinson, P., "Escritoire: a personal projected display," Multimedia, IEEE, vol. 12, No. 1, pp. 34-42, Jan.-Mar. 2005.

Chiu, P.; Kapuskar, A.; Reitmeier, S.; Wilcox, L., "Room with a rear view. Meeting capture in a multimedia conference room," Multimedia, IEEE, vol. 7, No. 4, pp. 48-54, Oct.-Dec. 2000.*

Pettelkau, Jeff. Toshiba TDP-SW20 Wireless DLP Projector. Oct. 2004 [retrieved on Mar. 15, 2007]. Retrieved from the Internet: <URL: http://www.jiwire.com/toshiba-TDP-SW20-wireless-projector-photo-image-gallery.htm>.

* cited by examiner

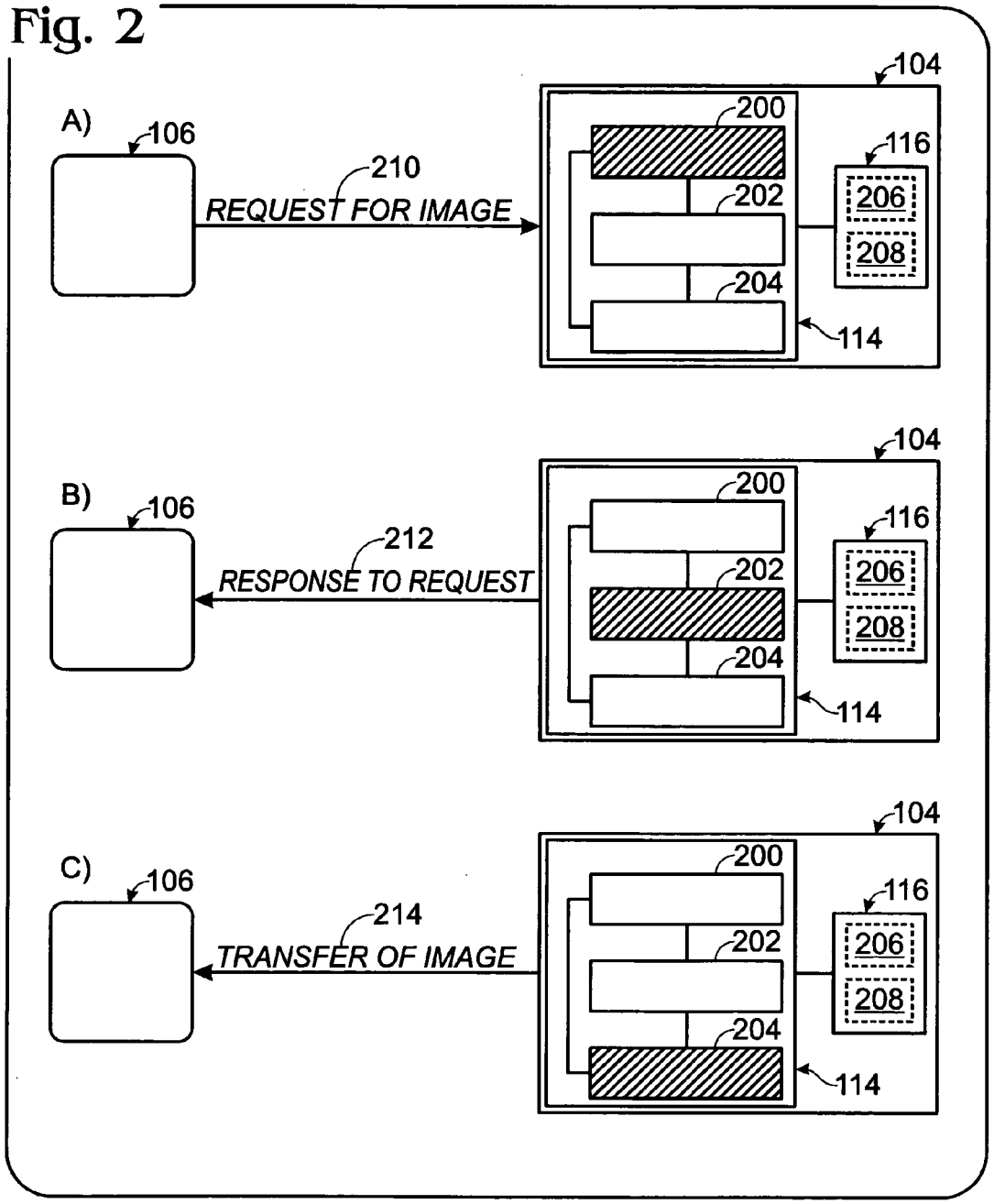

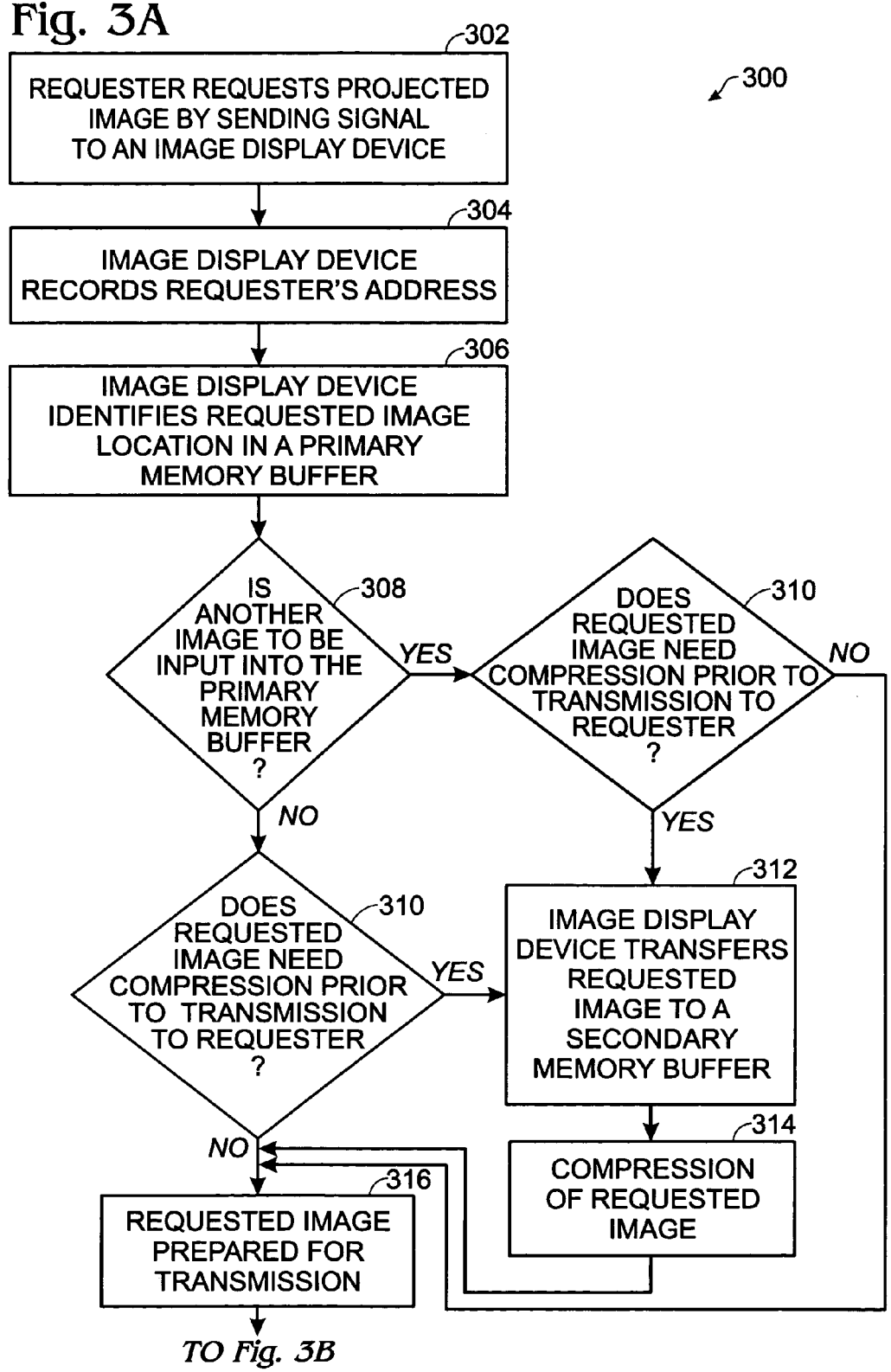

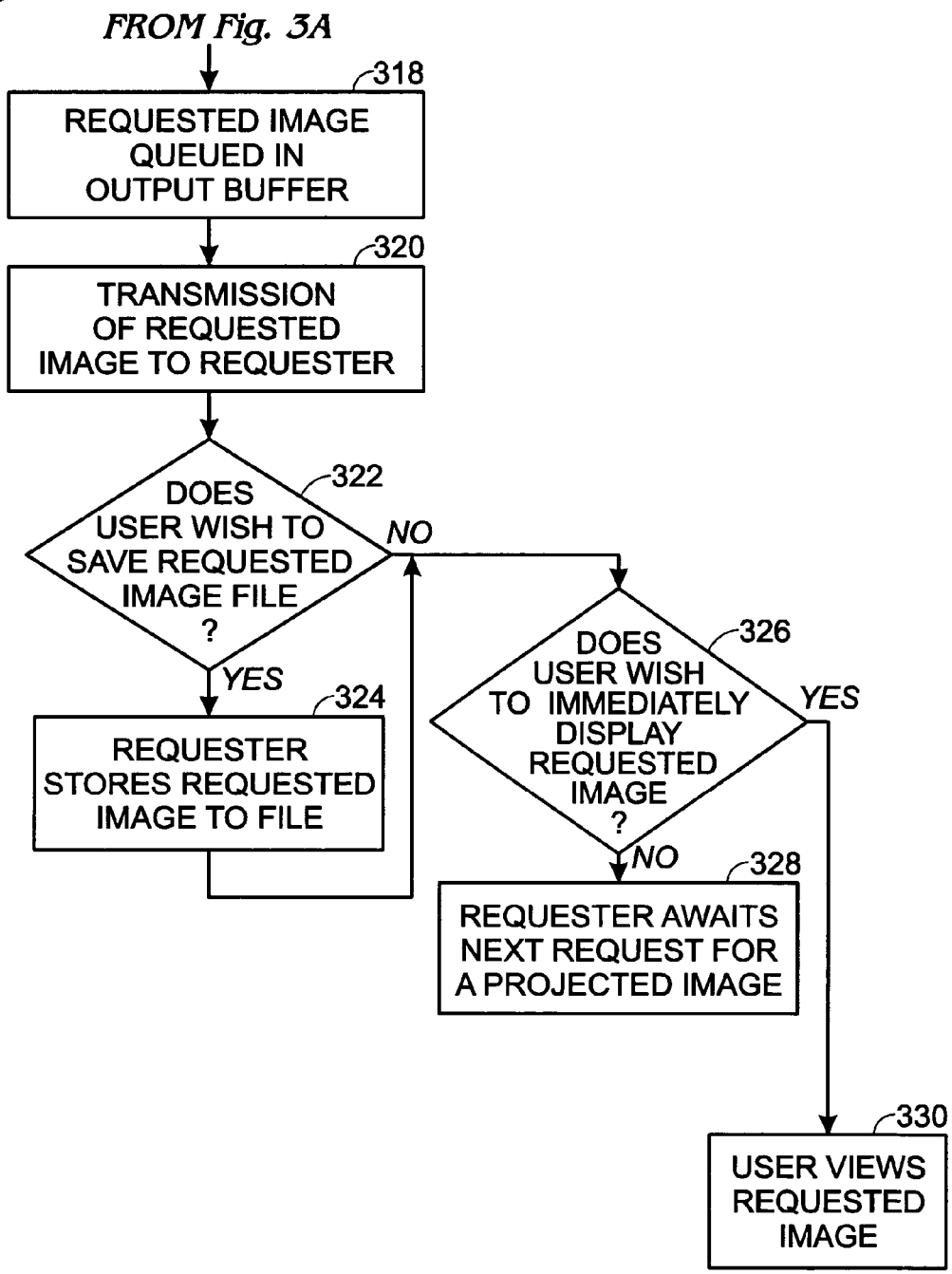

IMAGE CAPTURE METHOD, SYSTEM AND APPARATUS

CROSS-REFERENCE TO RELATED APPLICATIONS

The present application claims priority under 35 U.S.C. §119 to U.S. Provisional Patent Application Ser. No. 60/475,563, which was filed on Jun. 2, 2003. The disclosure of that application is hereby incorporated by reference in its entirety for all purposes.

TECHNICAL FIELD

The embodiments of the present disclosure relate generally to the sharing of data and, more specifically, to the transfer and capture of image data as displayed on an image display device.

BRIEF DESCRIPTION OF THE DRAWINGS

The disclosure is illustrated by way of example and not by way of limitation in the figures of the accompanying drawings, in which the like references indicate similar elements and in which:

FIG. 2 is a schematic illustration of the interaction between an image display device and a requesting device in the network system shown in FIG. 1, during the request for, and transmission of, a projected image.

FIG. 3A is a flow diagram of an embodiment of a method for transmitting requested projected image data to a requesting device from an image display device.

FIG. 3B is a continuation of the flow diagram of FIG. 3A.

DETAILED DESCRIPTION

Figure 1:
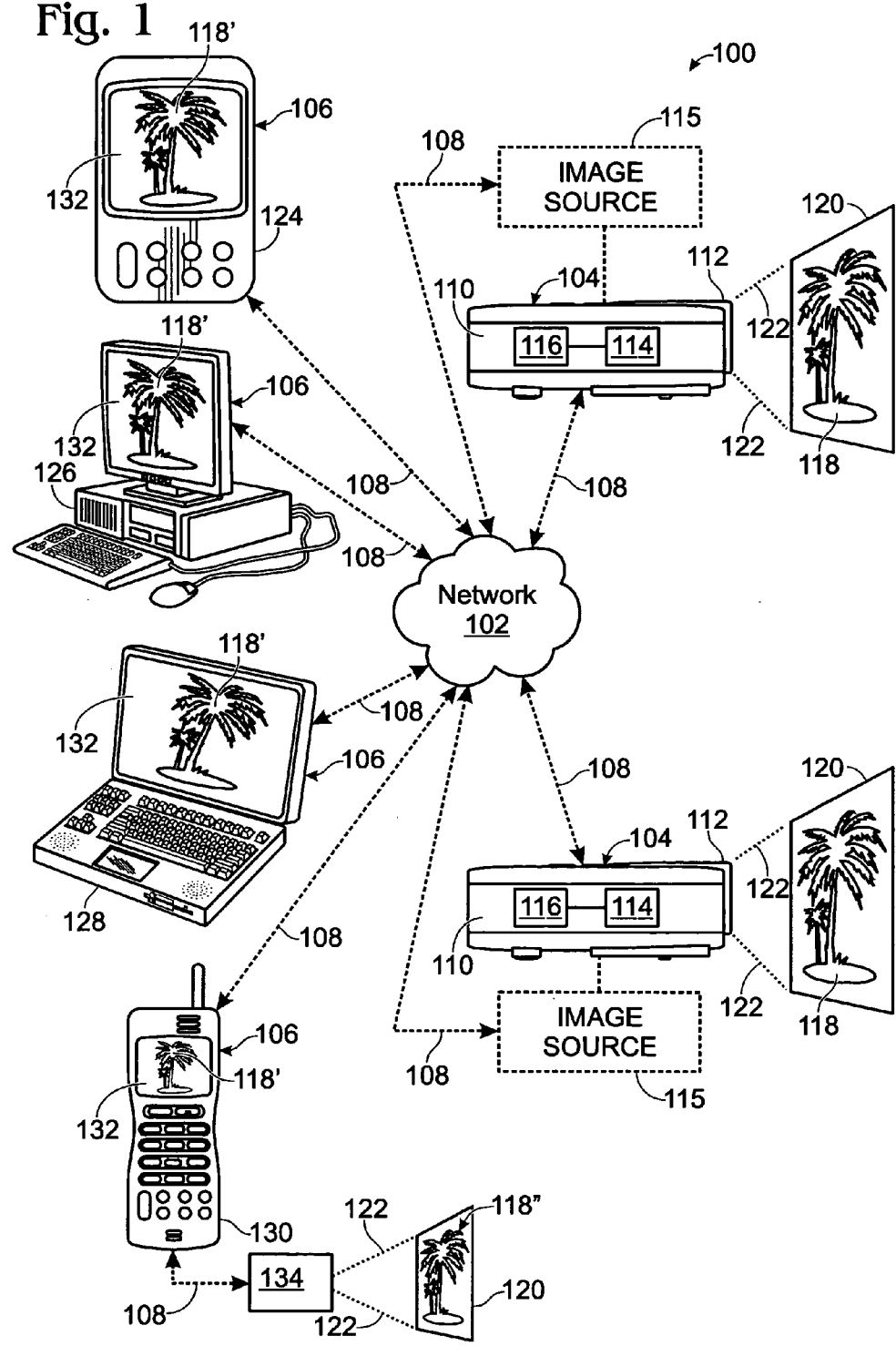
FIG. 1 is a depiction of an exemplary network system for the transmission of image data, which system may include one or more image display devices, one or more image sources, and one or more requesting devices.

FIG. 1 illustrates schematically, at 100, an exemplary image processing and display system configured for display and capture of one or more displayed images. Image processing and display system 100 may include a network 102 linking one or more image display devices 104 and one or more computing devices (also referred to herein as requesting devices or requesters) 106. Image display devices 104 and requesting devices 106 may be coupled to network 102 though one or more communication links 108.

Network 102 may be any suitable network configured to link a computing device with an image display device. For example, network 102 may include, but is not limited to: a local area network (LAN), a wide area network (WAN), a campus area network (CAN), a metropolitan area network (MAN), a home area network (HAN), a public or private network, or any combination thereof. Any other suitable network may also be used and is within the scope of the disclosure.

Requesting devices 106 and/or image display devices 104 may be linked to network 102 through one or more communication links 108. In some embodiments, communication links 108 may be wireless communication links. In other embodiments, communication links 108 may include any combination of wired communication links and/or wireless communication links. For example, communication link 108 may include, but is not be limited to: Ethernet, fast Ethernet, gigabit Ethernet, universal serial bus (USB), token ring, serial, parallel, Bluetooth, 802.11b, 802.11g, HomeRF, etc.

As described above, one or more image display devices 104 may be linked to network 102. Image display device 104 may be any suitable device configured to display an image. For example, image display device 104 may be configured to generate a projected image 118 and project the projected image 118 on a display surface 120. Display surface 120 may be any suitable image viewing surface, including, but not limited to: flexible plastic screens, rigid screens, walls, Fresnel-lens type screens, a single- or double-sided lenticular screens, a glass bead screens, etc.

Exemplary image display devices 104 include any suitable display device or image projector, including, but not limited to: a digital image display device, a digital projector, a liquid crystal display (LCD) projector, a digital light processing (DLP) projector, etc. Moreover, in some embodiments, image display device 104 may be a front projection device. In other embodiments, image display device 104 may be a rear projection display device. Additionally, image display device may be an image display device, such as, but not limited to: a television, a monitor, a video camera, a still camera, etc. It should be appreciated that although FIG. 1 illustrates only two image display devices, any number of image display devices may be linked to network 102 and be part of system 100.

For purposes of illustration, an exemplary image display device 104 is described. Exemplary display device 104 may include a body 110. Within body 110 may be components that enable the image display device to generate and display an image. For example, the image display device may include a memory 114, processor 116 and optical components (such as lens system 112). Exemplary image-generation devices which may be included within image display device 104 include, but are not limited to: digital micromirror devices (DMD), microelectromechanical systems (MEMS), grating light valve devices (GLV), liquid crystal display devices (LCD), liquid crystal on silicon devices (LCOS), etc. Optical components may include combinations of one or more filters, color wheels, lenses, mirrors, integrators, condensers, and other suitable optical elements.

Processor 116 and memory 114 of image display device 104 may be configured to control the processing and transmission of images which may be projected onto display device 120. Processor 116 may be a microprocessor, a control processor or other suitable control device. Memory 114 may include random access memory (RAM) and/or read only memory (ROM). Memory 114 may be used to temporarily store images prior to, during or following display. It should be appreciated that memory 114 may be disposed within the image display device or it may be coupled to the image display device, such as in the image source providing the image data. Alternatively, memory 114 may be disposed in a memory device which may be reversibly attached to image display device 104, such as a flash memory drive, a portable hard drive, a Zip drive, an image rendering device, etc.

In some embodiments, images may be provided to image display device 104 via image source 115. Image source 115 may be any suitable device configured to transmit images for display to image display device 104. For example, image source 115 may be a single source image source, such as a data or memory storage devices that may be integrated in, or removably coupled to, image display device 104. In other embodiments, image source 115 may be any suitable computing device configured to transmit images directly to image display device 104 or through a network (such as network 102) to image display device 104.

For example, exemplary image sources 115 include computers, servers, laptop computers or portable computers, telephones, personal digital assistants (PDA), handheld computers, desktop computers, cameras, etc. In the illustrated embodiment, image source 115 may be a linked computing device, one or more of the receiving devices as illustrated at 106, or a memory storage device. It should be appreciated that such images sources are intended for illustrative purposes and any number or type of images sources 115 may transmit or provide images to image display device 104.

In some embodiments, image source 115 may provide data to image display device 104. Data, as used herein, includes any suitable transferable data, including image data, graphical data, images, graphics, presentations, programs, applications, etc. Data, in the form of image data, may be transmitted from image source 115 such that it may be displayed and/or projected onto a display surface 120. The image data may be in a compressed format or other suitable form for transmission to image display device 104. Once the data is received, image display device 104 may generate an image based on the image data for display. Dashed lines 122 indicate projection of the image to display surface 120. Image, as used herein, may include a presentable or displayable image, including pictures, graphics, presentations, programs, applications, etc. and may further include the corresponding image data, graphical data, etc. It should be appreciated that image may include a single image or may include multiple images or sets of images.

As described above, also linked to network 102 in system 100 are requesting devices 106. Requesting devices 106 may be adapted to receive a requested image (such as a projected image) as requested from image display device 104. Requesting devices 106, as used herein, may be any suitable device configured to request a projected image from image display device 104. For example, requesting device 106 may include any suitable computing device, such as computers, servers, laptop computers or portable computers, telephones, personal digital assistants (PDA), cameras, handheld computers, desktop computers, etc. Exemplary requesting devices are illustrated in FIG. 1: a personal digital assistant 124, a stationary computer 126, a portable computer 128, a telephone 130.

It should be appreciated that although four requesting devices are shown, image processing and display system 100 may have any number of requesting devices linked to the network. Such requesting devices may be used with any number of image display devices 104 and may be utilized in combination with any number of image sources 115. Moreover, more than one network may be utilized to link such devices.

In the depicted image processing and display system 100, image display device 104 may receive image data from an image source 115. Image display device 104 may generate an image from the image data provided by the image source 115 and display the image as projected image 118 on a display surface 120.

Various users may be linked to image display device 104 through network 102. For example, a user may be linked through a receiving device, such as the receiving devices shown at 106, to image display device 104. In viewing the projected image 118, a user may select to view the projected image 118 on their own device.

The present system and method may enable a user to identify a projected image and request the projected image for viewing on their own device. For example, a user, through requesting device 106, may transmit a request to image display device 104 for projected image 118. In response to the request by requesting device 106, image display device 104 (and/or the image source 115) may transmit the requested image 118 to the requesting device 106. In some embodiments, a user may elect to view the requested image (as indicated at 118') on display 132 of the user's receiving device 106. However, it should be appreciated that the user may, in addition, or alternatively, store the requested image or further transmit the image to a different device. For example, in some embodiments, the requested image may be saved in the requesting device 106 or outputted to another device, such as a printer, a server, a secondary image display device, a network storage device, etc.

Specifically, in the illustrated embodiment, requesting devices 106 may be adapted to display a requested projected image 118' on a display or screen 132 of requesting device 106. For example, as illustrated in FIG. 1, requesting device 106 may display the requested projected image 118' on an integrated display device 132 of personal digital assistant 124, stationary computer 126, portable computer 128, telephone 130, etc. In some embodiments, requesting device 106 may also be configured to display requested projected image 118' on a non-integral display device 132. Non-integral display surfaces 132 may include cathode ray tubes (CRT), liquid crystal displays (LCD), plasma screens, etc.

In some embodiments, the computing device may request the image and transmit the requested image to a secondary display device. As an example and not as a limitation, a requesting device, such as telephone 130, may request image 118 and upon receiving image 118 transmit the requested image to a secondary image display device 134. Secondary image display device 134 may project the requested projected image as a secondary projected image 118".

Image processing and display system 100 provides a method for capture of projected images. Specifically, a network-capable image display device may be adapted to receive a request for a copy of a displayed image and respond to the request. The requested image may be automatically transmitted to a requesting device, such that the requesting device captures the image as projected by the image display device. In some embodiments, display of the image by the requesting device may be substantially concurrent with the display of the image by the image display device. It should be appreciated that the image display device may be adapted to receive multiple requests for multiple images, identify the requesting computing devices, and transmit requested images to the requesting devices according to their requests, thus allowing for accuracy and completeness in the sharing of presentation data and images between a presenter and his or her audience.

The use of image processing and display system 100 may enable a user to selectively capture images presented by a user of a projection device, such as a presenter. As an illustration of a use of the above system, and not as a limitation, the ability to electronically capture images of a presentation may enable a user of a requesting device to access details of the presentation which may be lost if relying on hand notes. For example, during prior presentations an audience member who may be watching an image display device presentation may be forced to take handwritten notes describing features of the presentation which they find interesting. These notes may be handwritten, or typed into a computing device, or they may be rough sketches of important images or figures. Complex presentation slides or images may be difficult to copy accurately or completely; and this difficulty may be exacerbated if the presenter of the talk moves rapidly through the slides or images. If a user desires to view the presentation on their device, the user may be forced to request that the presenter save the images on a storage medium and make such storage medium available. By providing a method and system for electronically capturing images of a presentation, an audience member may be able to avoid the above difficulties and inconveniences.

FIG. 2 further schematically illustrates a method for requesting a projected image as displayed by an image display device. It should be noted that this diagram is for illustrative purposes and is not intended to limit the scope of the disclosure.

As described above, image display device 104 may receive images and/or image data from an image source 115. Image display device 104 may be configured to generate an image based on image data and instructions from image source 115.

As described in FIG. 1, any one of the requesting devices 106 may be configured to request a projected image 118 as generated by image display device 104. Such a request (illustrated at 210) for projected image 118 is illustrated in Part A of FIG. 2. Specifically, requesting device 106 may transmit a request 210 for projected image 118 over the network 102 to image display device 104. The request 210 for projected image 118 may be any suitable command/request document in any suitable computing language. In some embodiments, request 210 for projected image 118 may include a request for a single projected image, a series of images, specific image data within an image, etc. Additionally, in some embodiments, request 210 for projected image 118 may include a request for images based on various attributes of the images or of the display of the images. For example, the request for projected image may include a request for images displayed over a period of time, images displayed with a certain format, images from a certain image source, etc. Any suitable user interface may be used to enable a user to define the request.

The request 210 for projected image may be transmitted through network 102 (shown in FIG. 1) to image display device 104. Image display device 104 may be adapted to receive the request 210 for projected image 118. In response to request 210, image display device 104 (or an operatively-coupled image source 115) may respond to the request, as indicated at 212. The response to the request may include preparing the requested projected image for transmission. For example, the images may be prepared by converting the images into a suitable transmission form. For example, displayed images may be temporarily stored in memory 114. Upon request for projected image 118, a temporarily stored image may be transmitted to an output buffer, packaged and appropriately formatted and sent/transferred (indicated at 214) to the requesting device 106. Thus, in some embodiments, the requested images may be sent as compressed images, image data files, or other suitable formats. Such formats may be predefined, selected by the user of a requesting device or preselected by an administrator of system 100.

It should be appreciated that multiple requesting devices may request the same projected image 118 from the image source 114. Thus, multiple copies of projected image 118 may be sent to multiple requesting devices 106.

Additional preparations for transmitting the requested projected image may be initiated. In some embodiments, authorization steps may be initiated to confirm that the requesting device is an authorized requesting device. Additionally confirmation notice may be sent to open a communication link between the image display device 104 (or the image source 115) and the requesting device 106.

FIG. 2 illustrates an exemplary method of receiving a request for a projected image and transmitting the requested image to the requesting device. In FIG. 2, image display device 104 (or image source 115) may include memory 114, which may in turn include primary memory 200, secondary memory 202 and output buffer 204. As described above, image display device 104 further includes a processor 116 which may be configured as a microprocessor 206 operatively coupled to an image processor 208. Shown schematically in FIG. 2 are a series of steps taken after requesting device 106 sends a request 210 for a projected image to image display device 104. The shading of primary memory 200, secondary memory 202 and output buffer 204 in FIG. 2 indicates the location of the projected image data in memory 114 of image display device 104. Primary memory 200, secondary memory 202, and output buffer 204 may be configured as, for example, dynamic random access memory (DRAM), static random access memory (SRAM), a hard disk, optical media, floppy disk, Zip™ disk, etc.

As shown schematically in FIG. 2A, the projected image data (indicated by shading in primary memory 200) may initially reside in primary memory 200 of image display device 104. Requesting device 106 may send a request 210 to image display device 104 requesting a copy of the projected image. The request may involve both requesting the projected image and checking to see if the projected image has been made available by the user of the image display device. It should be appreciated that there may be conditions under which the user of the image display device (the presenter) would make some or all of the projected images unavailable for request or transmission. For example, the user of the image display device may lock one or more images during presentation. Locking the images may make the image unavailable for capture. In some embodiments, a user may selectively lock the images such that they still may be available for transmission however, they may be locked in a format that prevents a user of the requesting device from manipulating (saving, altering, etc.) the image after receiving the image from the image display device. If the projected image is unavailable, the image display device 104 may send a communication or response to the request 212 stating the images have been locked and are unavailable for capture by the requesting device.

The request 210 for a projected image by requesting device 106 may lead to activity on the part of microprocessor 206, as shown in FIG. 2B. Upon receipt of the request, microprocessor 206 of processor 116 may direct transfer of the projected image data from primary memory 200 to secondary memory 202, where secondary memory 202 is available to receive a requested projected image data from primary memory 200. Alternatively, as discussed with regard to FIGS. 3A and 3B, microprocessor 206 may direct transfer of the requested projected image data directly from the primary memory 200 to output buffer 204. By transferring the image to secondary memory 202 and/or output buffer 204, primary memory 200 may be available to receive a next projected image, which may be projected by the image display device 104 under the control of image processor 208. A requested projected image stored in secondary memory 202 or output buffer 204 may be compressed, if needed, by microprocessor 206, as discussed in step 314 of FIG. 3A.

As described above, image display device 104 also may be configured to send, at the stage shown in FIG. 2B, a response message 212 to requesting device 106 confirming that the request for the projected image was received. The response message may further include information related to the processing of the requested image, or it may be a message informing the user of the requesting device 106 that the requested image is not available for transmission.

As shown in FIG. 2C, the requested projected image may be prepared for transfer from image display device 104 (or image source 115) to requesting device 106 when it resides in output buffer 204. The image may be transferred, as indicated at 214, from the output buffer 204 to the requesting device. In some embodiments, microprocessor 206 may append information to the requested projected image data identifying its file type, the date the file was written or requested, the size of the file, the author of the file, the compression method (if any), etc. Microprocessor 206 further may be configured to transmit the requested projected image data from output buffer 204 over network 102 to requesting device 106 via a wired communication link or via a wireless communication link when packaging of the requested projected image data is complete.

Turning now to FIGS. 3A and 3B, a method for transmitting requested projected image data to a requesting device from an image display device is shown. The method, as shown generally at 300, provides an exemplary method of requesting a projected image file as displayed by an image display device and processing the request such that the projected image is transmitted to a requesting device by the image display device. It will be appreciated that method 300 may employ the request and transmission methods and systems discussed earlier, however alternative methods and systems may be used to request a projected image and transmit the requested image to the requesting device.

In the initial step 302 of the exemplary method 300, a user may initiate via a requesting device, or requester, a request to an image source for a projected image. The request may include a request for transmission of the projected image in a specific format, for example the request may include a request for a compressed image file of the projected image.

The image display device may record the network address of the requesting device, at step 304. The network address of the requesting device may be temporarily stored in the image display device such that the requested image may be packaged and redirected to the requesting device's network address. In some embodiments, the image display device also may respond to the requesting device using the recorded network address. In some embodiments, the response may include a message that the request for a projected image was received. The response to the computing device also may indicate to the requesting device that the request is being processed and/or whether the requested projected image has been made available by the presenter. If the requested projected image has not been made available, the response to the requesting device may effectively end the communication between the requesting device and the image display device.

After recording the requesting device's address, the image source may identify (as shown at 306) the requested-projected image in the primary memory buffer (memory buffer shown schematically at 200 in FIG. 2). At step 308, the image display device may check whether another image is to be input into the primary memory buffer; this may be the data file for the next image to be displayed, for example, during a slide show or a Microsoft PowerPoint® presentation.

If there is another image data file to be input into the primary memory buffer ("yes" at 308) then the image source may determine, at step 310, if the currently-projected image data file needs to be compressed by the microprocessor prior to transmission to the requesting device. This might occur, for example, if the network has bandwidth requirements that need to be followed, if a user controlling the presentation has chosen to have all requested images compressed before transmission, or if a user requesting the projected image has chosen to have all requested images compressed before transmission. Alternatively, the software controlling the microprocessor may be configured as a default to perform compression on all data files over a given size (the size being, for example, 500 kilobytes, 1 megabyte, or 2 megabytes, etc.). If the answer to the question at decision 310 is "no" and there is no compression needed, then the projected image data file may be immediately prepared for transmission to the requesting device, at step 316. If the answer to the question at step 310 is "yes", and compression is necessary, the projected image data file may be transferred to the secondary memory buffer in step 312.

Returning to the decision at step 308, it is possible that there may be no next projected image to be input into the primary memory buffer after the request from the requesting device for the projected image. In this case, the image display device may check to see if the projected image needs compression; the conditions necessitating compression may be the same as described above for the decision at step 310. If the answer to "Does the image need compression?" is "no", then the projected image data file may be prepared, at step 316, for transmission to the computing device. If the answer to "Does the image need compression?" is "yes", then the projected image data file may be transferred to the secondary memory buffer in step 312, as previously noted for step 310.

Compression of the requested image may occur in step 314, while transfer to the secondary memory buffer may have occurred during step 312. Compression may be performed by the microprocessor and may follow a protocol suitable to the user of the requesting device and/or the user of the image display device. The projected image may be compressed in any number of formats, including, but not limited to: ARC, ZIP, jpg, gif, mpg, hqx, etc.

Whether the requested image has been compressed at step 314, or is being sent in uncompressed format, it may be prepared or packaged for transmission at step 316. As discussed above with regard to FIG. 2C, in some embodiments, preparing the requested image for transmission may involve appending information to the projected image describing the file type, the date the file was written or requested, the size of the file, the author of the file, the compression method (if any), or any other parameter desired by the user of the requesting device and/or the image display device. The requested image (or image file) may be queued in the output buffer at step 318, once preparations for transmission of the requested image are completed by the image display device. Typically, after the request and response is sent, no user input (either from the image display device or from the requesting device) is required for transmission of the image to occur. In this way, transmission of the image may be automatic. However, in some embodiments, the user of the display device (or an associated image source) may be able to manually approve or disapprove the transmission. Once approved, the transmission of the image to the requesting device may be automatic.

After queuing in the output buffer, the image may be transmitted to the requesting device over a network, at 320. In some embodiments, the image display device may automatically transmit the requested image once it is queued into the output buffer. In other embodiments, the image display device may delay transmission until such time as defined by the presenter, or the user of the requesting device. For example, the presenter may set a limit on transmission of requested images until the end of a presentation or during a break in the presentation. In addition, the image display device may also delay transmission of the requested image if the communication link between the image source and the requesting device becomes unavailable for use. For example, the image display device may hold transmission if a wired Ethernet communication link has been disrupted or if a wireless communication link is encountering interference or has been lost.

The requested image file may be received by the computing device after transmission of the requested image file by the image display device during step 320. In some embodiments, a user may select whether they wish to save the requested image, at step 322. If the user would like to save the requested image, the user may save the requested image file (as shown at step 324) on the requesting device or other suitable recording medium. The requested image may be maintained in the format in which it was transmitted to the computing device (whether compressed or uncompressed, or of a certain file type), or it may be converted by the requesting device into a format chosen by the user of the requesting device. In addition to saving the requested image to a format and/or location of the requesting device user's choice, the user of the requesting device may decide whether to display the requested image (at 326).

In some embodiments, a user may prefer to delay display of the requested image on the requesting device and only save the requested image for subsequent display and review. The requesting device may then be used to request another projected image, at 328. Alternatively, a user may select to immediately view the requested image and, if available, the requested projected image may be displayed on the requesting device or related device, at 330. It should be appreciated that the display device may be part of the receiving device or it may be external to the receiving device, such as a monitor linked to the receiving device. In this way an image is captured from a projected image and made available for use by a requesting device.

It should be appreciated that the presenter or user of the image display device may be able to limit manipulation of the captured image. For example, in some embodiments, images may be packaged in a read-only state or other format such that a user of the requesting device is limited to the types of manipulation that may be applied to the captured image.

It should be appreciated that the request for a projected image, the processing of that request, and the transmission and receipt of the requested image data file may be fully automated according to user preferences. For example, in some embodiments, the projected image data file may be stored as part of a "master file" that includes all slides requested during a particular meeting. In some embodiments, the projected image data file may be stored with provisions for adding annotations or notes to the requested image.

It further should be appreciated that the above system and method for capturing a projected image may include one or more end-user programs that may facilitate the request for a projected image and the processing and transmission of the requested projected image. The end-user program may be in the form of software or of firmware. The end-user program may provide for communication and/or command functions in the form of a web interface, a stand-alone program, a program utility, a web browser plug-in, an application plug-in, etc. The end-user program may provide functionality to the system allowing the user of a requesting device to make a request for a projected image. The end-user program may also provide functionality to the system allowing the user of the image display device (the presenter) to control the sequence of projected images and to control the availability of projected images with regard to other users' requests. Additionally, the end-user program may contain instructions allowing it to control various functions of the image display device and request and transmission of projected images. The program further may be configured to facilitate communication between the requesting device and the image display device and/or it may be configured to control the processors and memory of the image display device and requesting device during the request for, and processing and transmission of, a projected image to the requesting device.

Although the present disclosure includes specific embodiments, specific embodiments are not to be considered in a limiting sense, because numerous variations are possible. The subject matter of the present disclosure includes all novel and nonobvious combinations and subcombinations of the various elements, features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method for selectively accessing during a presentation, a projected image of the presentation as displayed by an image display device, the method comprising:
    requesting the image display device to transmit over a network a specific select image of the presentation as displayed by the image display device,
        wherein a request for the select image is based on a requested image attribute,
        wherein the select image is part of the presentation concurrently displayed by the image display device,
        wherein the select image is one of a single projected image, a series of projected images within the presentation, and specific image data within a projected image;
        wherein requesting the image display device to transmit the select image comprises requesting the image display device to determine that the select image has been unlocked and made available by a user of the image display device;
    receiving, in response to requesting the select image, a response to the request from the image display device, the response including a message indicating that the select image has been unlocked and made available by a user of the image display device; and
    receiving, in response to requesting the select image, a copy of the select image as projected concurrently by the image display device from the image display device.

2. The method of claim 1, wherein requesting the image display device to transmit the select image as displayed by the image display device, where the request for the select image is based on the requested image attribute, includes wirelessly sending the request for the select image as projected by the image display device based on the requested image attribute.

3. The method of claim 1, wherein requesting the select image as projected by the image display device, where the request for the select image is based on the requested image attribute, includes providing identity information to the image display device.

4. The method of claim 1, wherein the select image is selectively locked to prevent subsequent manipulation upon receiving the copy of the select image.

5. The method of claim 1, further comprising, upon receiving the copy of the select image, immediately viewing the copy of the select image.

6. The method of claim 1, further comprising, upon receiving the copy of the select image, saving the copy of the select image for subsequent viewing.

7. A method for image capture between an image display device and a requesting device during a presentation displayed by the image display device, the method comprising:
receiving a request to capture a specific select image from the presentation from the requesting device, where the request is based on a requested image attribute associated with the select image, and where the requested select image is projected concurrently by the image display device as part of the presentation;
receiving a request to determine that the select image has been unlocked and made available by a user of the image display device;
determining if the select image is unlocked and available for delivery;
selecting the select image,
preparing the select image for transmission to the requesting device; and
if the select image has been made unlocked and available by a user of the image display device.

8. The method of claim 7, further comprising identifying a network address for the requesting device.

9. The method of claim 7, further comprising confirming that the request is authorized.

10. The method of claim 7, wherein preparing the select image for transmission to the requesting device includes formatting the select image in a select format.

11. The method of claim 10, wherein the select format is a compressed format.

12. The method of claim 11, wherein preparing the select image for transmission to the requesting device includes formatting the select image in a compressed format if the select image is over a given size.

13. The method of claim 10, wherein the select format is a locked format to prevent subsequent manipulation.

14. The method of claim 7, wherein preparing the select image for transmission to the requesting device includes transferring the select image to an output buffer.

15. The method of claim 7, wherein transmitting the select image to the requesting device occurs without user input from the user of the image display device.

16. The method of claim 7, further comprising, if the select image is unavailable for capture, not transmitting the select image to the requesting device.

17. The method of claim 7, wherein the select image is one of a single projected image of the presentation, a series of projected images of the presentation, and specific image data within a projected image of the presentation.

18. The method of claim 7, wherein the request to capture the specific select image, preparing the select image for transmission to the requesting device, and transmitting the select image to the requesting device is fully automated according to user preferences.

19. An image processing and display system comprising:
a network;
an image display device coupled to the network, the image display device configured to project an image of a presentation, the image display device further configured to receive and process one or more requests to determine if the select image is unlocked and available for capture, and to transmit a response to the requesting device indicating an availability of the select image and to capture select images of the presentation being projected concurrently by the image display device, and to select and transmit the select image, each select image being one of a single projected image of the presentation, a series of projected images of the presentation, and specific image data within a projected image of the presentation; and
a requesting device coupled to the network, the requesting device configured to request a specific select image of the presentation based on an image attribute and if the select image is unlocked and available, to capture the select image as projected substantially concurrently by the image display device.

20. The image processing and display system of claim 19, wherein the image attribute of the select image is selected from a group consisting of a time period of an image display, an image format, and an image source.

21. The image processing and display system of claim 20, wherein the image display device is configured to transmit the select image to the requesting device if the select image is available for capture.

22. The image processing and display system of claim 19, wherein the select image is selectively locked to prevent subsequent manipulation.

23. An apparatus for displaying images, the apparatus comprising:
a processor configured to generate an image for display;
memory linked to the processor to store the image; and
optical components configured to display the image;
wherein the processor is further configured to receive a request from a networked requesting device corresponding to a request for a specific select image based on an image attribute, determine if the select image is unlocked and available for delivery, and select, package and transmit the select image to the requesting device substantially concurrently with displaying the select image, the select image being part of a presentation concurrently displayed by the apparatus.

24. The apparatus of claim 23, wherein the select image is one of a single projected image, a series of projected images within a presentation, and specific image data within a projected image of the presentation.

25. The apparatus of claim 24, wherein the processor is further configured to identify and the memory is configured to store a network address of the requesting device.

26. The apparatus of claim 24, wherein the processor is further configured to identify whether the request from the requesting device is an authorized request.

27. The apparatus of claim 24, wherein the processor is configured to package the image in a compressed format.

28. A program storage device readable by a machine, the storage device tangibly embodying a program of instructions executable by the machine to perform a method for image capture, the method comprising:
receiving a request for transmission of a specific select image of a presentation as projected substantially concurrently wherein the request for transmission of the select image is based on an image attribute;
determining if the request is received from an authorized requesting device;
determining if the requested select image has been unlocked and made available by a user of the image display device;
if the requested select image is unlocked and available for capture, directing preparation of the requested select image for transmission from the image display device to the authorized requesting device; and
directing transmission of the requested select image from the image display device to the authorized requesting device.

29. The method of claim 28, further comprising providing a user interface on a network that is configured to enable a user to request transmission of the select image from the image display device to the requesting device.

30. The method of claim 29, further comprising providing a user interface on a network that is configured to enable a user to define the image attribute on which the request for transmission of the select image is based.

31. The method of claim 28, wherein determining if the request is received from the authorized requesting device includes identifying a requesting device that sent the request for transmission of the select image.

32. A method for image capture between an image display device and a requesting device, the method comprising:
  receiving a request to capture a specific select image during a presentation as projected concurrently by the image display device, where the request to capture the select image is based on a requested image attribute associated with the select image and the select image includes an option enabling the select image to be selectively locked to prevent subsequent manipulation after capture;
  determining if the requested select image has been unlocked and made available by a user of the image display device;
  preparing the select image for transmission to the requesting device upon receiving the request; and
  transmitting the select image to the requesting device.

33. The method of claim 32, wherein the select image is one of a single projected image, a series of projected images within a presentation, and specific image data within a projected image of the presentation.

34. The method of claim 33, wherein the requested image attribute is selected from the group consisting of a time period of an image display, an image format, and an image source.

35. The method of claim 34,
  wherein receiving the request for the select image includes wirelessly receiving the request for the select image,
  wherein transmitting the select image to the requesting device includes wirelessly transmitting the select image.

36. The method of claim 32, wherein preparing the select image for transmission includes limiting types of subsequent manipulation that may be applied to the select image.

* * * * *